(12) United States Patent
Etchegoyen et al.

(10) Patent No.: US 9,286,466 B2
(45) Date of Patent: Mar. 15, 2016

(54) REGISTRATION AND AUTHENTICATION OF COMPUTING DEVICES USING A DIGITAL SKELETON KEY

(71) Applicant: Uniloc Luxembourg, S.A., Luxembourg (LU)

(72) Inventors: Craig S. Etchegoyen, Plano, TX (US); Dono Harjanto, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 108 days.

(21) Appl. No.: 13/832,982

(22) Filed: Mar. 15, 2013

(65) Prior Publication Data

US 2014/0281561 A1 Sep. 18, 2014

(51) Int. Cl.
*G06F 21/00* (2013.01)
*G06F 21/44* (2013.01)
*G06F 21/73* (2013.01)

(52) U.S. Cl.
CPC ............... *G06F 21/44* (2013.01); *G06F 21/73* (2013.01); *G06F 2221/2103* (2013.01)

(58) Field of Classification Search
CPC .......... H04L 29/08; H04L 67/14; G06F 21/44
USPC ........................................................ 713/182
See application file for complete search history.

(56) References Cited

U.S. PATENT DOCUMENTS

| 4,246,638 A | 1/1981 | Thomas |
| 4,779,224 A | 10/1988 | Cargile |
| 4,891,503 A | 1/1990 | Jewell |
| 4,956,863 A | 9/1990 | Goss |

(Continued)

FOREIGN PATENT DOCUMENTS

| EP | 1 739 879 | 6/2005 |
| EP | 1 637 958 | 3/2006 |

(Continued)

OTHER PUBLICATIONS

Anup K. Ghosh; Examining the risks in wireless computing that will likely influence the emerging m-commerce market; Feb. 2001/vol. 44, No. 1-7.*

(Continued)

*Primary Examiner* — Monjour Rahim
(74) *Attorney, Agent, or Firm* — Sean D. Burdick

(57) ABSTRACT

A method for registering a computing device to a user account using at least one user-selected fingerprintable device externally accessible to the computing device including transmitting a registration information request to the computing device, receiving at least one device fingerprint of the at least one user-selected fingerprintable device accessible by the computing device, and primary identification data of the computing device, generating a skeleton key, recording the primary identification data, and associating the skeleton key and the primary identification data with the user account. A method for authenticating the computing device including transmitting an authentication information request to the computing device, receiving an encrypted identification data from the computing device, decrypting the encrypted identification data using a skeleton key associated with the user account, comparing the decrypted identification data with a primary identification data associated with the user account, and authenticating the computing device.

7 Claims, 18 Drawing Sheets

(56) References Cited

U.S. PATENT DOCUMENTS

| | | | |
|---|---|---|---|
| 5,210,795 A | 5/1993 | Lipner et al. |
| 5,235,642 A | 8/1993 | Wobber et al. |
| 5,239,166 A | 8/1993 | Graves |
| 5,241,594 A | 8/1993 | Kung |
| 5,666,415 A | 9/1997 | Kaufman |
| 6,041,411 A | 3/2000 | Wyatt |
| 6,167,517 A | 12/2000 | Gilchrist et al. |
| 6,243,468 B1 | 6/2001 | Pearce et al. |
| 6,330,608 B1 | 12/2001 | Stiles |
| 6,418,472 B1 | 7/2002 | Mi et al. |
| 6,799,272 B1 | 9/2004 | Urata |
| 6,826,690 B1 | 11/2004 | Hind et al. |
| 6,981,145 B1 | 12/2005 | Calvez et al. |
| 7,082,535 B1 | 7/2006 | Norman et al. |
| 7,083,090 B2 | 8/2006 | Zuili |
| 7,100,195 B1 | 8/2006 | Underwood |
| 7,178,025 B2 | 2/2007 | Scheidt et al. |
| 7,181,615 B2 | 2/2007 | Fehr et al. |
| 7,233,997 B1 | 6/2007 | Leveridge et al. |
| 7,234,062 B2 | 6/2007 | Daum et al. |
| 7,272,728 B2 | 9/2007 | Pierson et al. |
| 7,305,562 B1 | 12/2007 | Bianco et al. |
| 7,310,813 B2 | 12/2007 | Lin et al. |
| 7,319,987 B1 | 1/2008 | Hoffman et al. |
| 7,418,665 B2 | 8/2008 | Savage |
| 7,590,852 B2 | 9/2009 | Hatter et al. |
| 7,836,121 B2 | 11/2010 | Elgressy et al. |
| 8,171,287 B2 | 5/2012 | Villela |
| 8,327,448 B2 | 12/2012 | Eldar et al. |
| 8,484,705 B2 | 7/2013 | Hoppe et al. |
| 2002/0065097 A1 | 5/2002 | Brockenbrough et al. |
| 2002/0091937 A1 | 7/2002 | Ortiz |
| 2002/0178366 A1* | 11/2002 | Ofir ............... 713/182 |
| 2003/0056107 A1 | 3/2003 | Cammack et al. |
| 2003/0061518 A1* | 3/2003 | Yamaguchi et al. ......... 713/201 |
| 2003/0065918 A1 | 4/2003 | Wiley |
| 2003/0097331 A1 | 5/2003 | Cohen |
| 2003/0120920 A1 | 6/2003 | Svensson |
| 2003/0156719 A1 | 8/2003 | Cronce |
| 2003/0182428 A1 | 9/2003 | Li et al. |
| 2004/0003228 A1 | 1/2004 | Fehr et al. |
| 2004/0026496 A1 | 2/2004 | Zuili |
| 2004/0030912 A1 | 2/2004 | Merkle et al. |
| 2004/0049685 A1 | 3/2004 | Jaloveczki |
| 2004/0107360 A1 | 6/2004 | Herrmann et al. |
| 2004/0117321 A1 | 6/2004 | Sancho |
| 2004/0143746 A1 | 7/2004 | Ligeti et al. |
| 2004/0149820 A1 | 8/2004 | Zuili |
| 2004/0172531 A1 | 9/2004 | Little et al. |
| 2004/0172558 A1 | 9/2004 | Callahan et al. |
| 2004/0177255 A1 | 9/2004 | Hughes |
| 2004/0187018 A1 | 9/2004 | Owen et al. |
| 2005/0018687 A1 | 1/2005 | Cutler |
| 2005/0034115 A1 | 2/2005 | Carter et al. |
| 2005/0166263 A1 | 7/2005 | Nanopoulos et al. |
| 2005/0268087 A1 | 12/2005 | Yasuda et al. |
| 2006/0005237 A1 | 1/2006 | Kobata et al. |
| 2006/0036766 A1 | 2/2006 | Baupin et al. |
| 2006/0080534 A1 | 4/2006 | Yeap et al. |
| 2006/0085310 A1 | 4/2006 | Mylet et al. |
| 2006/0090070 A1 | 4/2006 | Bade et al. |
| 2006/0161914 A1 | 7/2006 | Morrison et al. |
| 2006/0168580 A1 | 7/2006 | Harada et al. |
| 2006/0265446 A1 | 11/2006 | Elgressy et al. |
| 2007/0061566 A1 | 3/2007 | Bailey et al. |
| 2007/0078785 A1 | 4/2007 | Bush et al. |
| 2007/0094715 A1 | 4/2007 | Brown et al. |
| 2007/0113090 A1 | 5/2007 | Villela |
| 2007/0124689 A1 | 5/2007 | Weksel |
| 2007/0143408 A1 | 6/2007 | Daigle |
| 2007/0143838 A1 | 6/2007 | Milligan et al. |
| 2007/0174633 A1 | 7/2007 | Draper et al. |
| 2007/0198850 A1 | 8/2007 | Martin et al. |
| 2007/0207780 A1 | 9/2007 | McLean |
| 2007/0209064 A1 | 9/2007 | Qin et al. |
| 2007/0219917 A1 | 9/2007 | Liu et al. |
| 2007/0260883 A1 | 11/2007 | Giobbi et al. |
| 2008/0028455 A1 | 1/2008 | Hatter et al. |
| 2008/0052775 A1 | 2/2008 | Sandhu et al. |
| 2008/0104683 A1 | 5/2008 | Nagami et al. |
| 2008/0120195 A1 | 5/2008 | Shakkarwar |
| 2008/0120707 A1 | 5/2008 | Ramia |
| 2008/0152140 A1 | 6/2008 | Fascenda |
| 2008/0177997 A1 | 7/2008 | Morais et al. |
| 2008/0242405 A1 | 10/2008 | Chen et al. |
| 2008/0261562 A1 | 10/2008 | Jwa et al. |
| 2008/0268815 A1 | 10/2008 | Jazra et al. |
| 2008/0289025 A1 | 11/2008 | Schneider |
| 2009/0019536 A1 | 1/2009 | Green et al. |
| 2009/0083833 A1 | 3/2009 | Ziola et al. |
| 2009/0113088 A1 | 4/2009 | Illowsky et al. |
| 2009/0132813 A1 | 5/2009 | Schibuk |
| 2009/0138643 A1 | 5/2009 | Charles et al. |
| 2009/0198618 A1 | 8/2009 | Chan et al. |
| 2009/0271851 A1 | 10/2009 | Hoppe et al. |
| 2009/0300744 A1 | 12/2009 | Guo et al. |
| 2010/0197293 A1 | 8/2010 | Shem-Tov |
| 2010/0306038 A1 | 12/2010 | Harris |
| 2011/0093943 A1 | 4/2011 | Nakagawa et al. |
| 2011/0244829 A1* | 10/2011 | Kase ............... 455/411 |
| 2011/0271109 A1 | 11/2011 | Schilling et al. |
| 2012/0030771 A1 | 2/2012 | Pierson et al. |
| 2013/0031619 A1 | 1/2013 | Waltermann et al. |
| 2013/0174231 A1* | 7/2013 | Stavropoulos et al. ........... 726/5 |
| 2013/0183936 A1 | 7/2013 | Smith et al. |

FOREIGN PATENT DOCUMENTS

| | | |
|---|---|---|
| EP | 2 037 389 | 2/2008 |
| EP | 2 096 597 | 9/2009 |
| GB | 2355322 | 4/2001 |
| WO | WO 92/09160 | 5/1992 |
| WO | WO 00/58895 | 10/2000 |
| WO | WO 01/90892 | 11/2001 |
| WO | WO 03/032126 | 4/2003 |
| WO | WO 2004/054196 | 6/2004 |
| WO | WO 2005/104686 | 11/2005 |
| WO | WO 2008/013504 | 1/2008 |
| WO | WO 2008/127431 | 10/2008 |

OTHER PUBLICATIONS

Posting from Slashdot on the article "Smart Cards for Windows XP Login" Comment "Re: PIN" posted Dec. 3, 2001. http://en.wikipedia.org/w/index.php?title=Two-factor_authentication&ildid=216794321.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Iovation, "Using Reputation of Devices to Detect and Prevent Online Retail Fraud," *White Paper*, Apr. 2007.

Iovation, "Controlling High Fraud Risk of International Transactions," *Iovation Reputation Services, White Paper*, May 2007.

Jensen et al., "Assigning and Enforcing Security Policies on Handheld Devices," 2002, 8 pages.

Johnson et al. "Dynamic Source Routing in Ad Hoc Wireless Networks," *Mobile Computing*, Kluwer Academic Publishers, 1996.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

| W | XYZ | XZY | YXZ | YZX | ZYX | ZXY |
|---|-----|-----|-----|-----|-----|-----|
| X | $W^X$ | $W^X$ | $W^{YX}$ | $W^{YZX}$ | $W^{ZYX}$ | $W^{ZX}$ |
| Y | $W^{XY}$ | $W^{XZY}$ | $W^Y$ | $W^Y$ | $W^{ZY}$ | $W^{ZXY}$ |
| Z | $W^{XYZ}$ | $W^{XZ}$ | $W^{YXZ}$ | $W^{YZ}$ | $W^Z$ | $W^Z$ |

FIG. 5

| W | XY | XZ | YX | YZ | ZY | ZX |
|---|---|---|---|---|---|---|
| X | $W^X$ | $W^X$ | $W^{YX}$ | | | $W^{ZX}$ |
| Y | $W^{XY}$ | | $W^Y$ | $W^Y$ | $W^{ZY}$ | |
| Z | | $W^{XZ}$ | | $W^{YZ}$ | $W^Z$ | $W^Z$ |

FIG. 6

| W | X | Y | Z |
|---|---|---|---|
| X | $W^X$ | | |
| Y | | $W^Y$ | |
| Z | | | $W^Z$ |

FIG. 7

REGISTRATION AND AUTHENTICATION OF COMPUTING DEVICES USING A DIGITAL SKELETON KEY

BACKGROUND OF THE INVENTION

1. Field of the Invention

The present invention relates generally to a registration and authentication of computing devices using device recognition technology. More specifically, the invention relates to the registration of a computing device using a user-selected fingerprintable device externally accessible to the computing device to generate a digital skeleton key, and the authentication of a computing device or a user of the computing device using the digital skeleton key.

2. Description of the Related Art

In a conventional registration process for a computing device, a server will receive a user-selected password to associate with a user account. Later on during authentication, the server will ask the user to reproduce the user-selected password. The computing device is authenticated when the user-selected password is correctly reproduced. However, a user of the computing device may forget the password. To make the password easier to remember, the user may choose a password which is not very strong, such as those which contain words or numbers that are associated with the user, or have a limited number of characters. In such a case, the password may be easily discovered by hackers on the Internet.

In the alternative, if the user creates a very long and complex password, the user may be forced to write or store the user-selected password on a document either in virtual (computer file) or physical (paper) form. This can lead to the loss of the user-selected password, or the theft of the document. Again, these would be undesirable outcomes.

A device fingerprint of the user's computing device has also been proposed as an alternative to the user-selected password. In such a case, the device fingerprint of the computing device would replace the user-selected password. The device fingerprint would provide a stronger password than the user-selected password since it can be composed of various characters which are not associated with the user. In addition, the device fingerprint could be composed of a larger number of characters than the user-selected password since the user would not have to memorize the device fingerprint.

However, in the case where the computing device is shared by many users, use of a device fingerprint as a password may be undesirable since a different user may access the user account by virtue of being granted access to the computing device. While the number of users with access to the computing device may be limited, such potential access may still be unacceptable for security purposes.

Thus, there is a need for improved technology for registering and authenticating a computing device.

SUMMARY OF THE INVENTION

The present invention provides a method for authenticating a computing device using a skeleton key. A skeleton key server registers a computing device to a user account using at least one user-selected fingerprintable device externally accessible to the computing device by executing the following salient steps: transmitting a registration information request to the computing device, receiving at least one device fingerprint of the at least one user-selected fingerprintable device accessible by the computing device, and primary identification data of the computing device, generating a skeleton key using the at least one device fingerprint of the at least one user-selected fingerprintable device, recording the primary identification data, and associating the skeleton key and the primary identification data with the user account.

In an embodiment, the skeleton key can comprise one or more different device fingerprints in a specific or non-specific order, wherein each device fingerprint corresponds to a different user-selected fingerprintable device. The use of the device fingerprints of the user-selected fingerprintable devices and the skeleton key can, for example, allow a user to securely register his computing device without having to remember complex passwords. Instead, the user can remember which user-selected fingerprintable devices to use to register the computing device.

Furthermore, in an embodiment, the user-selected fingerprintable devices are not essential for operation of the computing device. This can allow, for example, a wide variety of fingerprintable devices to be used, including electronic devices which are obsolete, outdated, or have limited use.

In another embodiment, the present invention includes a computer readable medium useful in association with a skeleton key server which includes one or more processors, and a memory, the computer readable medium including computer instructions which are configured to cause the skeleton key server, by execution of the computer instructions in the one or more processors from the memory, to implement registration of a computing device to a user account using at least one user-selected fingerprintable device externally accessible to the computing device by performing the salient steps.

In another embodiment, the present invention includes a computer system including at least one processor, a computer readable medium that is operatively coupled to the processor, and a computing device registration logic that (i) executes in the processor from the computer readable medium and (ii) when executed by the processor causes the computer system to implement registration of a computing device to a user account using at least one user-selected fingerprintable device externally accessible to the computing device by executing the salient steps.

The invention also provides a method for authentication of a computing device using the skeleton key. A skeleton key server authenticates a computing device associated with a user account using at least one user-selected fingerprintable device externally accessible to the computing device by executing the following second set of salient steps: transmitting an authentication information request to the computing device, receiving an encrypted identification data from the computing device which has been encrypted by at least one device fingerprint of at least one user-selected fingerprintable device accessible by the computing device, decrypting the encrypted identification data using a skeleton key associated with the user account, comparing the decrypted identification data with a primary identification data associated with the user account, and authenticating the computing device when the decrypted identification data matches the primary identification data.

Likewise, during authentication, the use of the device fingerprints of the user-selected fingerprintable devices and the skeleton key can, for example, allow a user to securely authenticate his computing device without having to remember complex passwords. Instead, the user can remember which user-selected fingerprintable devices to use to authenticate the computing device.

In another embodiment, the present invention includes a computer readable medium useful in association with a skeleton key server which includes one or more processors, and a memory, the computer readable medium including computer instructions which are configured to cause the skeleton key server, by execution of the computer instructions in the one or more processors from the memory, to implement authentication of a computing device associated with a user account using at least one user-selected fingerprintable device accessible by the computing device by executing the second set of salient steps.

In another embodiment, the present invention includes a computer system including at least one processor, a computer readable medium that is operatively coupled to the processor, and a computing device registration logic that (i) executes in the processor from the computer readable medium and (ii) when executed by the processor causes the computer system to implement authentication of a computing device associated with a user account using at least one user-selected fingerprintable device externally accessible to the computing device by executing the second set of salient steps.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

FIG. 5 is a model of a skeleton key depicting various encryption and decryption keys for a set of device fingerprints according to an embodiment of the present invention.

FIG. 6 is another model of a skeleton key depicting various encryption and decryption keys for a set of device fingerprints according to an embodiment of the present invention.

FIG. 7 is another model of a skeleton key depicting various encryption and decryption keys for a set of device fingerprints according to an embodiment of the present invention.

DETAILED DESCRIPTION

The present invention relates to a method and system for registration and authentication of a computing device using a digital skeleton key. Herein, the term "skeleton key" is understood to mean a digital skeleton key, or equivalently, a set of digital codes or device fingerprints from which one or a limited many encryption keys may be derived.

Figure 1:
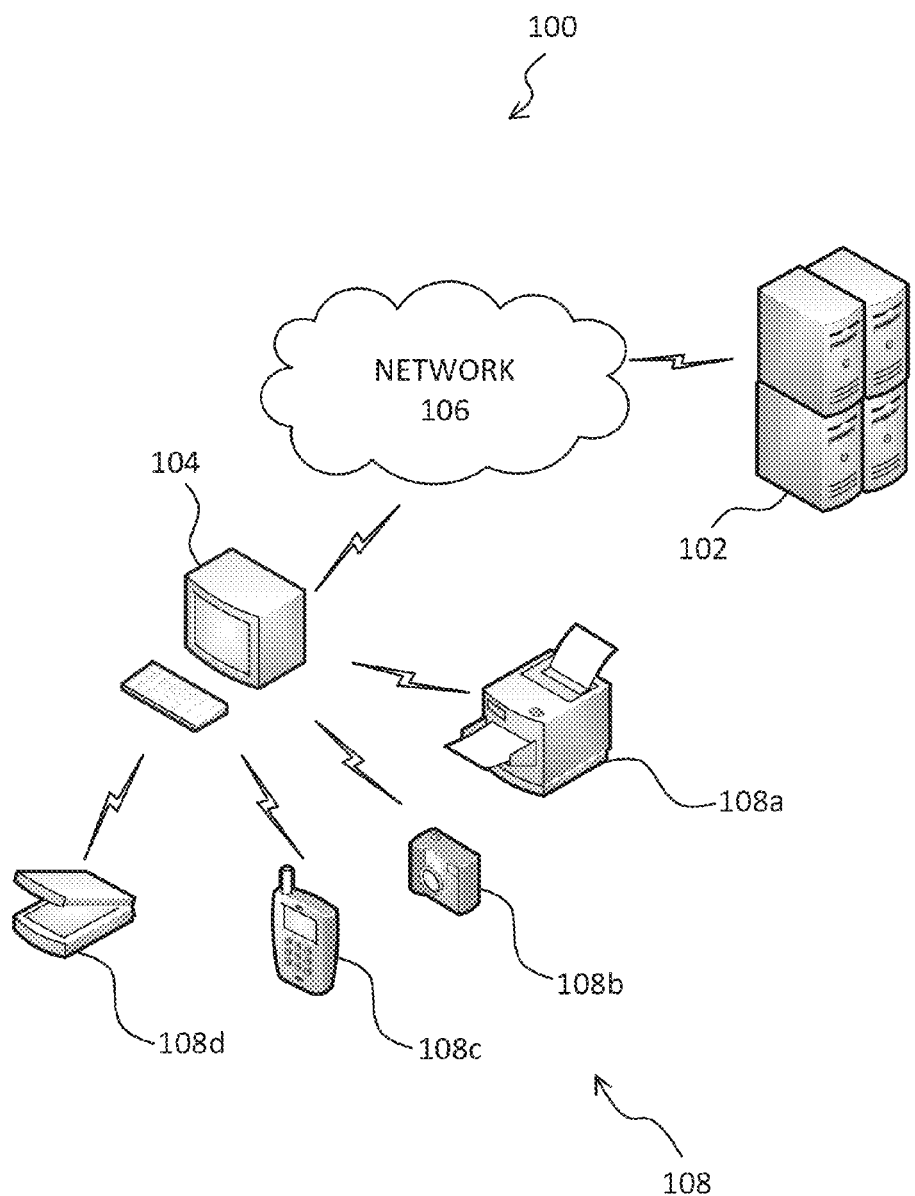
FIG. 1 is a diagram showing an exemplary system in which a registration or an authentication of a computing device by a skeleton key server may occur according to an embodiment of the present invention.

As seen in FIG. 1, a communication system 100 includes, for example, a skeleton key server 102 and a computing device 104, which are both connected by a network 106. The network 106 can be, for example, the Internet, telephone network, wide area network, local area network, and/or any combination thereof. In an embodiment, the communication system 100 can facilitate secure communication between the skeleton key server 102 and the computing device 104. The secure communication can include, for example, transmission of data, or a completion of a transaction.

In FIG. 1, user-selected fingerprintable devices 108, such as the user-selected fingerprintable devices 108a-d are accessible by the computing device 104. The user-selected fingerprintable device 108a can be, for example, a printer. The user-selected fingerprintable device 108b can be, for example, a digital camera. The user-selected fingerprintable device 108c can be, for example, a mobile phone. The user-selected fingerprintable device 108d can be, for example, a scanner.

Furthermore, the user-selected fingerprintable devices 108 could be other electronic devices which are device fingerprintable and accessible by the computing device 104. In an embodiment, the user-selected fingerprintable devices 108 are accessible when they are external to the computing device 104, but can still transfer electronic information to the computing device 104, such as when they are physically attached or plugged in to computing device 104, or when the computing device 104 can otherwise access electronic information from the user-selected fingerprintable devices 108, such as through a wireless connection. In an embodiment, the user-selected fingerprintable devices 108 are fingerprintable such that they comprise persistent computer readable data including unique identifying indicia that are accessible by the computing device 104. For example, a user-selected fingerprintable device 108 may be a peripheral device having a communication port that allows computing device 104 to read a serial number of a CPU within the peripheral device, a MAC address, or other persistent data stored within the peripheral device, such as a model number, version number, revision number, manufacturer name, or some other component serial number stored in a ROM. In an embodiment, the user-selected fingerprintable devices 108 are not essential for an operation of the computing device 104.

The computing device 104 can access one or more of the user-selected fingerprintable devices 108 to generate device fingerprints of the user-selected fingerprintable devices, which will be described in more detail below. The computing device 104 can then transmit the device fingerprints of the user-selected fingerprintable devices 108 to the skeleton key server 102 to register the computing device 104. The computing device 104 can also use the device fingerprints of the user-selected fingerprintable devices 108 to encrypt primary identification data that can be transmitted to the skeleton key server 102 to authenticate the computing device 104.

Figure 2:
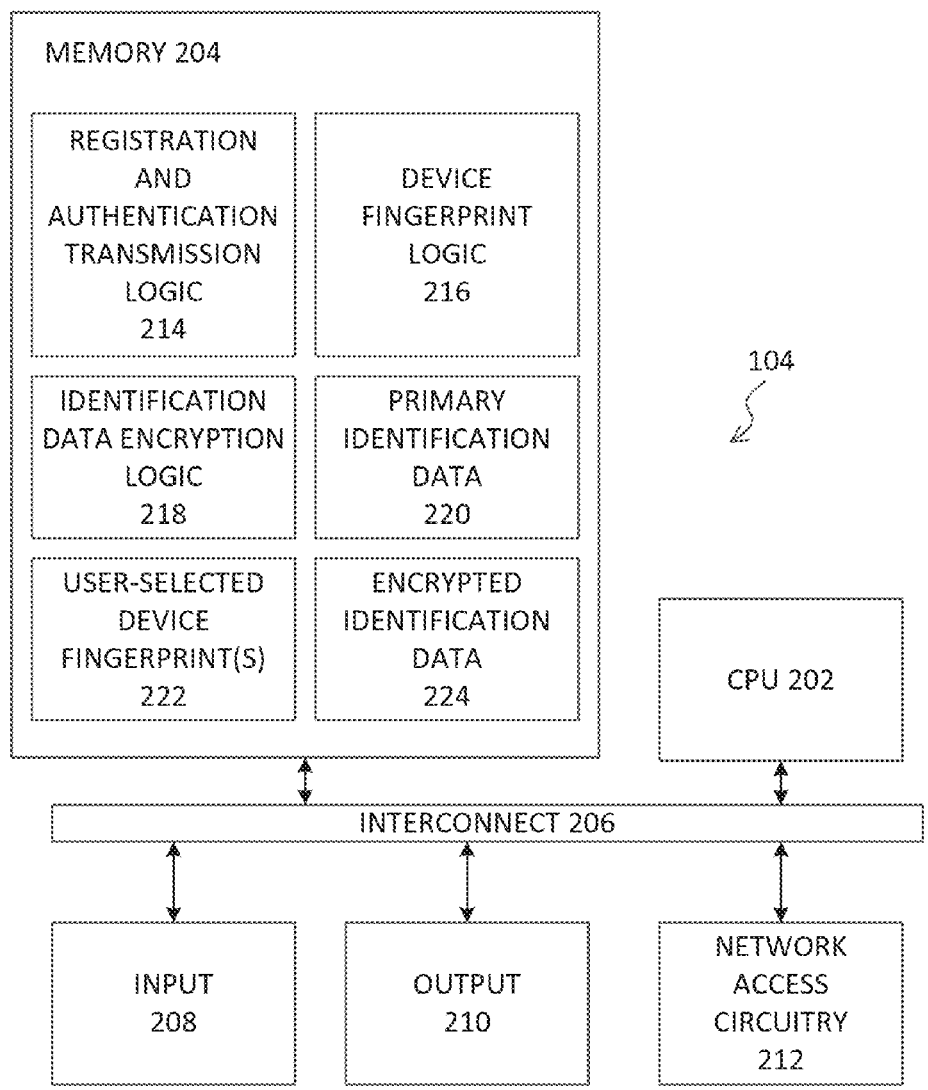
FIG. 2 is a block diagram showing functional components that make up a computing device according to an embodiment of the present invention.

As seen in FIG. 2, the computing device 104 can include, for example, one or more microprocessors, which are collectively shown as CPU 202. The computing device 104 also includes, for example, a memory 204, an interconnect 206, an input 208, an output 210, and/or a network access circuitry 212. The CPU 202 can retrieve data and/or instructions from the memory 204 and execute the retrieved instructions. The memory 204 can include generally any computer-readable medium including, for example, persistent memory such as magnetic and/or optical disks, ROM, PROM and volatile memory such as RAM.

The CPU 202 and the memory 204 are connected to one another through the interconnect 206, which is a bus in this illustrative embodiment. The interconnect 206 connects the CPU 202 and the memory 204 to one or more input devices 208, one or more output devices 210, and the network access circuitry 212. The input devices 208 can include, for example, a keyboard, a keypad, a touch-sensitive screen, a mouse, a microphone, and/or one or more cameras. The output devices 210 can include, for example, a display—such as a liquid crystal display (LCD)—and/or one or more loudspeakers. The network access circuitry 212 sends and receives data through computer networks such as the network 106 (FIG. 1).

A number of components of the computing device 104 are stored in the memory 204. In particular, a registration and authentication transmission logic 214 is part of one or more computer processes executed within the CPU 202 from the memory 204 in this illustrative embodiment, but can also be implemented using digital logic circuitry. As used herein, "logic" refers to (i) logic implemented as computer instructions and/or data within one or more computer processes and/or (ii) logic implemented in electronic circuitry.

In an embodiment, the registration and authentication transmission logic 214 is executable software stored within the memory 204. For example, the registration and authentication transmission logic 214 can transmit registration information or authentication information responsive to receiving a registration information request or an authentication information request from the skeleton key server 102.

When the computing device 104 receives a registration information request from the skeleton key server 102, the registration and authentication transmission logic 214 is executed to transmit one or more device fingerprints from one or more user-selected fingerprintable devices 108 accessible by the computing device 104. In an embodiment, the registration information request can specify a number of user-selected fingerprintable devices 108 to be fingerprinted. Furthermore, the registration information request can also request a primary identification data 220 of the computing device 104, which will be described in more detail below.

In addition, the registration information request can also include a user prompt which is displayed by the computing device 104 at the output 210. The user prompt prompts the user to make accessible to the computing device 104 the user-selected fingerprintable devices 108. For example, if the number of user-selected fingerprintable devices accessible by the computing device in the registration information is one, the user prompt may prompt the user to make accessible to the computing device 104 a single user-selected fingerprintable device 108. For example, the user may make accessible to the computing device 104 one of the user-selected fingerprintable devices 108*a*-108*d* disclosed in FIG. 1.

In another example, if the number of user-selected fingerprintable devices accessible by the computing device in the registration information is three, the user prompt may prompt the user to make accessible to the computing device 104 three user-selected fingerprintable devices 108. For example, the user may make accessible to the computing device 104 three of the user-selected fingerprintable devices 108*a*-108*c* disclosed in FIG. 1.

In an embodiment, the user can make accessible the user-selected fingerprintable devices 108 to the computing device 104 by electrically connecting or wirelessly connecting the user-selected fingerprintable devices 108 to the computing device 104. The user prompt may present at output 210 a list of connected fingerprintable devices 108 for selection by the user. The user prompts may be utilized during initial registration, or during a subsequent authentication attempt. In the latter case, the user may be prompted to connect one or more peripheral devices from which device fingerprint data may be retrieved by computing device 104 to encrypt primary identification data in response to an authentication challenge from a skeleton key server. The peripheral devices may be identified using obscure or fanciful terms that have relevance only to the authorized user. Advantageously, this discourages unauthorized access to the server by unscrupulous individuals who, in all likelihood, have no idea which peripheral devices are associated with such terms.

The registration and authentication transmission logic 214 can utilize a device fingerprint logic 216 to generate a device fingerprint 222 from data taken from one or more of the user-selected fingerprintable devices 108. Device fingerprints and generation thereof are known and are described, e.g., in U.S. Pat. No. 5,490,216 (sometimes referred to herein as the '216 Patent), and in related U.S. Patent Application Publications 2007/0143073, 2007/0126550, 2011/0093920, and 2011/0093701 (the "related applications"), the descriptions of which are fully incorporated herein by reference.

In general, the device fingerprint 222 comprises a bit string or bit array that includes or is derived from user-configurable and non-user-configurable data specific to the user-selected fingerprintable device 108. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information. In an embodiment, the device fingerprint 222 can also include, for example, manufacture name, model name, and/or device type of the user-selected fingerprintable device 108. In an embodiment, the device fingerprint 222 can include hardware attributes of the user-selected fingerprintable device 108 which are retrievable by the computing device 104 through an API from the hardware device driver for the user-selected fingerprintable device 108.

Generation of the device fingerprint 222 includes a combination of operations on the data specific to the user-selected fingerprintable device 108, which may include processing using a combination of sampling, concatenating, appending (for example, with a nonce value or a random number), obfuscating, hashing, encryption, and/or randomization algorithms to achieve a desired degree of uniqueness. For example, the desired degree of uniqueness may be set to a practical level such as 99.999999% or higher, to achieve a probability of less than 1 in 100,000,000 that any two fingerprintable devices will generate identical fingerprints. In an embodiment, the desired degree of uniqueness may be such that the device fingerprint 222 generated is unlike any other device fingerprint generatable for a user-selected fingerprintable device 108 which is accessible by the computing device 104.

In one embodiment, the device fingerprint 222 may be stored in volatile memory and erased after transmission of the device fingerprints 222 responsive to the registration information request from the skeleton key server 102. In another embodiment, the device fingerprint 222 may be stored in persistent memory and written over each time a new device fingerprint is generated by the device fingerprint logic 216.

The registration and authentication transmission logic 214 can generate, for example, the primary identification data 220. The primary identification data 220 can be information which identifies the computing device 104. In an embodiment, the primary identification data 220 is a device fingerprint of the computing device 104. In such a case, the registration and authentication transmission logic 214 utilizes the device fingerprint logic 216 to generate the device fingerprint of the computing device 104. The primary identification data 220 can also include, for example, a user identification code in addition to the device fingerprint. The user identification code can be an alphanumeric code such as a username or a user-selected computer name which identifies the computing device 104.

Furthermore, the registration and authentication transmission logic 214 can also transmit, responsive to the registration information request, a user account information to the skeleton key server 102. The user account information specifies a user account with which the device fingerprints 222 and the primary identification data 220 should be associated.

When the computing device 104 receives an authentication information request from the skeleton key server 102, the registration and authentication transmission logic 214 is executed to transmit an encrypted identification data 224 to the skeleton key server 102. In an embodiment, the authentication information request can specify a number of user-selected fingerprintable devices 108 to be fingerprinted for generation of the encrypted identification data 224. The authentication information request can also request the user account information.

In addition, the registration information request can also include a user prompt which is displayed by the computing device 104 at the output 210. The user prompt prompts the user to make accessible to the computing device 104 the number of user-selected fingerprintable devices 108 requested in the authentication information request.

The registration and authentication transmission logic 214 can utilize the device fingerprint logic 216 to generate device fingerprints 222 of the user-selected fingerprintable devices 108. The registration and authentication transmission logic 214 can then use the identification data encryption logic 218 to generate the encrypted identification data 224. The identification data encryption logic 218 encrypts the primary identification data 220 using the device fingerprints 222. In an embodiment, the encryption can occur, for example, using an XOR function, a hash function, or any combination thereof. Other encryption functions may also be used to encrypt the primary identification data 220 using the device fingerprints 222. For example, data 220 and fingerprints 222 may comprise inputs to a hashing algorithm. Or, one or more device fingerprints may be used as an encryption key in an encryption sequence or algorithm.

Figure 3:
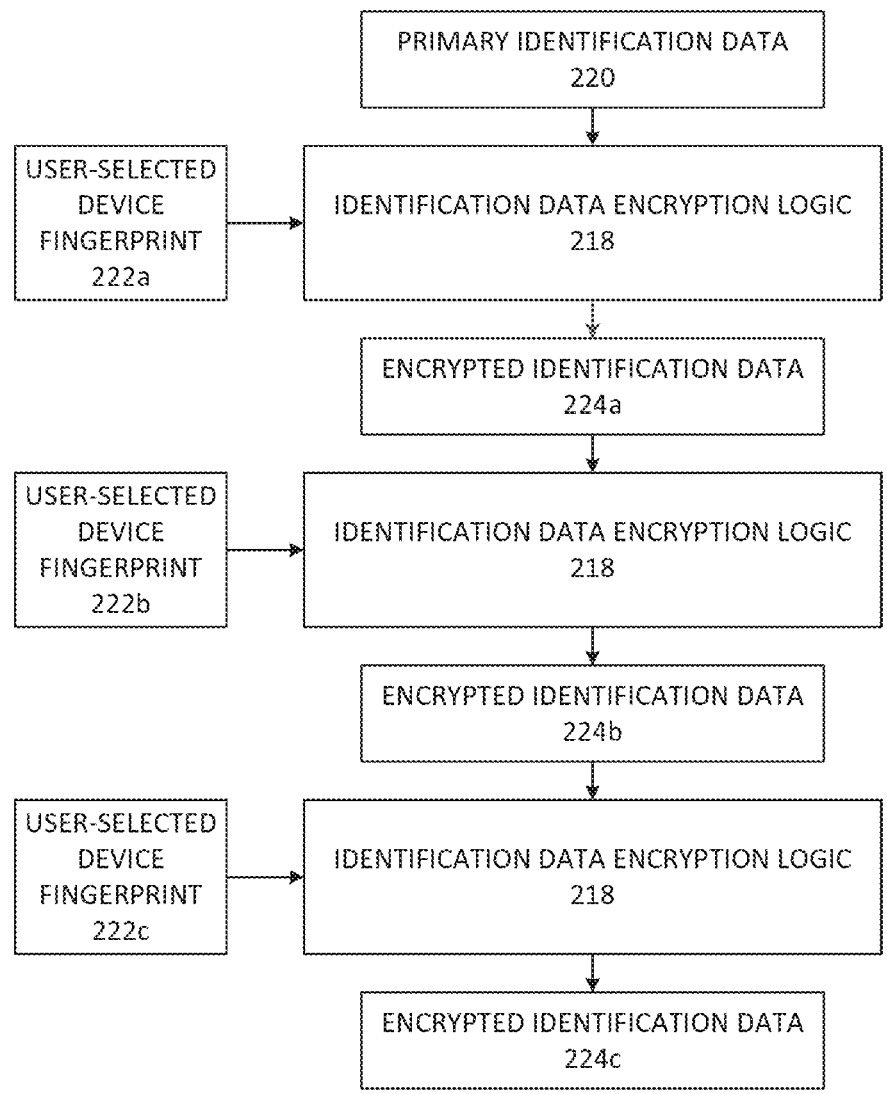
FIG. 3 is a process flow diagram depicting an encryption of identification data by identification data encryption logic using device fingerprints according to an embodiment of the present invention.

In one embodiment, as seen in FIGS. 1 and 3, three user-selected fingerprintable devices 108a, 108b, and 108c, are made accessible by the user such that the device fingerprints 222a, 222b, and 222c are generated, respectively, for the devices by the device fingerprint logic 216. The identification data encryption logic 218 encrypts the primary identification data 220 using the device fingerprints 222a, 222b, and 222c to generate the encrypted identification data 224c, which will be transmitted to the skeleton key server 102.

Figure 9:
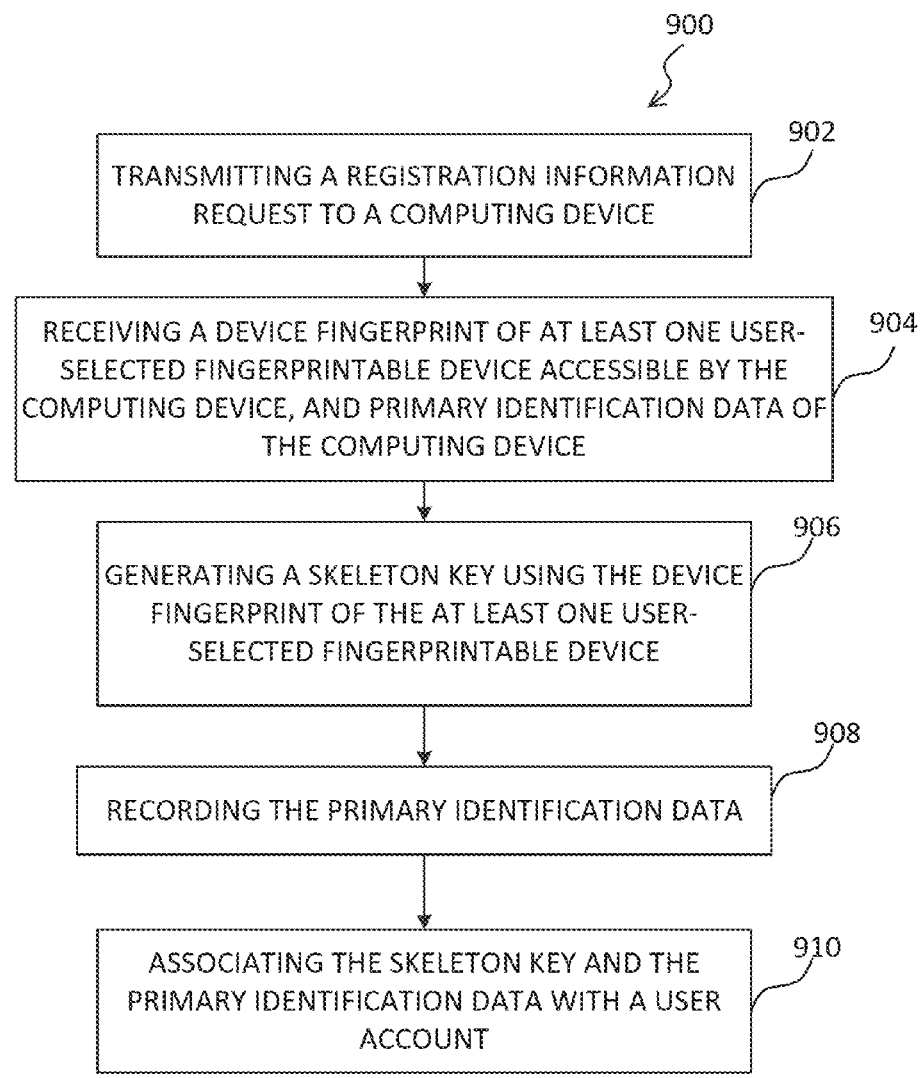
FIG. 9 is a process flow diagram showing steps for a skeleton key server to register a computing device according to an embodiment of the present invention.

In an initial communication, to a skeleton key server 102, of device fingerprints from user-selectable devices peripheral to a computing device 104, it is preferable to transmit multiple such device fingerprints, e.g. three or more, to establish a complex and comprehensive skeleton key. As will be described in greater detail below, according to an embodiment of the invention, there is an exponential relationship between the number of device fingerprints provided and the number of encryption keys derivable from a combination thereof, such that a single such device fingerprint provides for the skeleton key only one possible encryption key, whereas two such device fingerprints provide for the skeleton key four possible encryption keys, and whereas three such device fingerprints provide for the skeleton key fifteen possible encryption keys, and so on. The initial communication may be made, for example, during a registration routine in response to a request as in step 902 of FIG. 9.

After the comprehensive skeleton key is established in a registration process for a computing device 104, the skeleton key server may utilize the skeleton key in subsequent authentication procedures for authenticating the computing device. In any subsequent authentication attempt, the skeleton key server will have access to every possible constituent encryption key that is derivable from the peripheral device fingerprints. Thus, in any such subsequent authentication, a computing device 104 may, in response to an authentication information request or challenge from the server, transmit identification data to the server that has been encrypted by any one of the constituent encryption keys. The choice of a constituent encryption key for use in response to any particular challenge may vary according to a predetermined sequence, or a time-variant sequence, or according to a random selection process running, for example, as part of the code comprising the identification data encryption logic 218.

Once a particular encryption key is chosen, the following example illustrates a process for generating the desired encryption key: The identification data encryption logic 218 first encrypts the primary identification data 220 using the device fingerprint 222a to generate an encrypted identification data 224a. The identification data encryption logic 218 then encrypts the encrypted identification data 224a using the device fingerprint 222b to generate the encrypted identification data 224b. The identification data encryption logic 218 then encrypts the encrypted identification data 224b using the device fingerprint 222c to generate the encrypted identification data 224c, which is transmitted to the skeleton key server 102.

Figure 4:
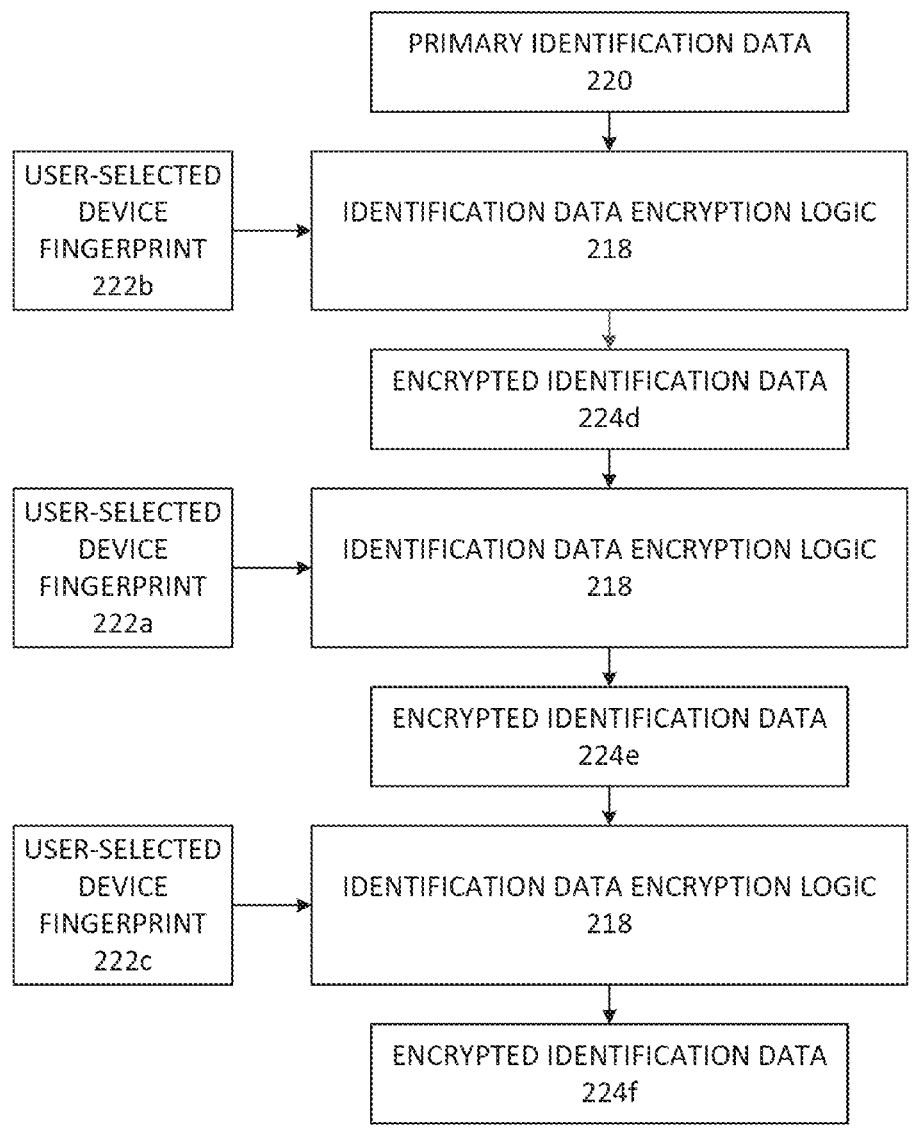
FIG. 4 is a block diagram depicting a scheme for encryption of identification data by identification data encryption logic using device fingerprints according to an embodiment of the present invention.

In one exemplary embodiment, the order of use of the device fingerprints 222a, 222b, and 222c during encryption of primary identification data 220 by encryption logic 218 will produce an output of encrypted identification data that differs from the output produced by a different order of use of the same device fingerprints used with the same encryption logic 218. For example, as seen in FIG. 4, the three user-selected fingerprintable devices 108a, 108b, and 108c, are made accessible by the user such that the device fingerprints 222a, 222b, and 222c are generated by the device fingerprint logic 216. However, the order of encryption using the device fingerprints 222a, 222b, and 222c will be varied by the identification data encryption logic 218 in order to generate the encrypted identification data 224f, which is different than the encrypted identification data 224c.

The identification data encryption logic 218 first encrypts the primary identification data 220 using the device fingerprint 222b to generate an encrypted identification data 224d. The encrypted identification data 224d disclosed in FIG. 4 is different than the encrypted identification data 224a disclosed in FIG. 3. The identification data encryption logic 218 then encrypts the encrypted identification data 224d using the device fingerprint 222a to generate the encrypted identification data 224e. The encrypted identification data 224e disclosed in FIG. 4 is different than the encrypted identification data 224b disclosed in FIG. 3. The identification data encryption logic 218 then encrypts the encrypted identification data 224e using the device fingerprint 222c to generate the encrypted identification data 224f, which is transmitted to the skeleton key server 102. As previously noted, the encrypted identification data 224f disclosed in FIG. 4 is different than the encrypted identification data 224c disclosed in FIG. 3.

Of course other combinations and orders of encryptions can be used to encrypt the primary identification data 220 and generate the encrypted identification data 224. For example, as seen in FIG. 5, the primary identification data 220 is represented as the letter "W", the device fingerprint 222a is represented as the letter "X", the device fingerprint 222b is represented as the letter "Y", the device fingerprint 222c is represented as the letter "Z". Furthermore, XYZ, XZY, YXZ, YZX, ZYX, and ZXY represent the order in which the device fingerprints X, Y, and Z are used to encrypt the primary identification data W.

Thus, in the XYZ iteration, the identification data W is encrypted by the device fingerprint X to form the encrypted identification data $W^X$. The encrypted identification data $W^X$ is then encrypted by the device fingerprint Y to form the encrypted identification data $W^{XY}$. The encrypted identification data $W^{XY}$ is then encrypted by the device fingerprint Z to form the encrypted identification data $W^{XYZ}$.

In the XZY iteration, the identification data W is encrypted by the device fingerprint X to form the encrypted identification data $W^X$. The encrypted identification data $W^X$ is encrypted by the device fingerprint Z to form the encrypted identification data W. The encrypted identification data $W^{XZ}$ is encrypted by the device fingerprint Y to form the encrypted identification data $W^{XZY}$.

The collection of all possible encryption keys associated with a computing device 104, whether singular keys or sequences of encryption keys, for encrypting primary identification data 220 using the peripheral device fingerprints, comprises a digital skeleton key. As used herein, each key or unique sequence of keys in the collection comprises a constituent key of the skeleton key collective.

A similar process is shown for the remaining iterations YXZ, YZX, ZYX, and ZXY. Furthermore, although three user-selected fingerprintable devices 108 are made accessible by the user, all three device fingerprints of the three user-selected fingerprintable devices 108 need not be used to generate the encrypted identification data 224. For example, as seen in FIG. 6, two of the three device fingerprints for the three user-selected fingerprintable devices 108 are used to generate the encrypted identification data 224. Likewise, as seen in FIG. 7, only one of the three device fingerprints of the three user-selected fingerprintable devices 108 is used to generate the encrypted identification data 224.

In an embodiment, the information disclosed in FIGS. 5-7 can also be used, for example, as a skeleton key to decrypt the encrypted identification data 224, as discussed in further detail below.

Figure 8:
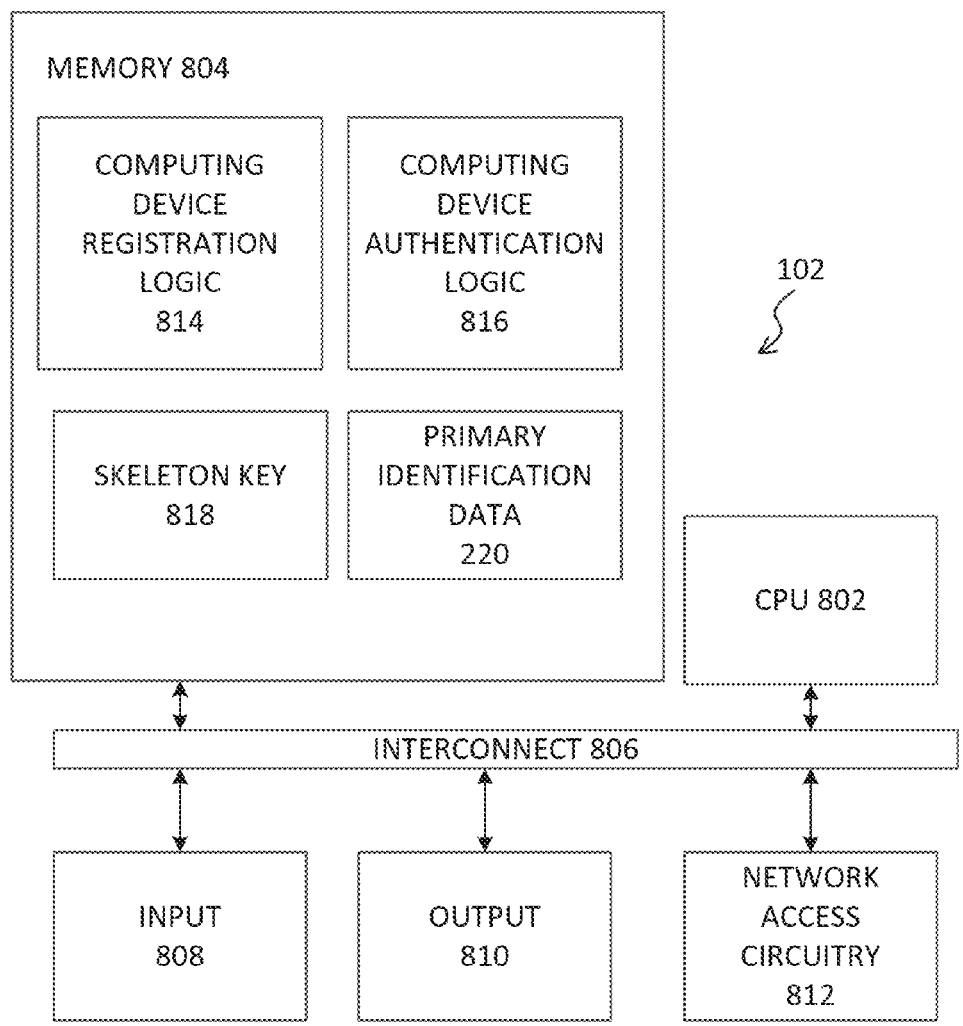
FIG. 8 is a block diagram showing functional components that make up a skeleton key server according to an embodiment of the present invention.

The skeleton key server 102 can be seen, for example, in FIG. 8. The skeleton key server 102 can include, for example, one or more microprocessors, which are collectively shown as CPU 802. The skeleton key server 102 also includes, for example, a memory 804, an interconnect 806, an input 808, an output 810, and/or a network access circuitry 812. The CPU 802 can retrieve data and/or instructions from the memory 804 and execute the retrieved instructions. The memory 804 can include generally any computer-readable medium including, for example, persistent memory such as magnetic and/or optical disks, ROM, and PROM and volatile memory such as RAM.

The CPU 802 and the memory 804 are connected to one another through the interconnect 806, which is a bus in this illustrative embodiment. The interconnect 806 connects the CPU 802 and the memory 804 to the input devices 808, the output devices 810, and the network access circuitry 812. The input devices 808 can include, for example, a keyboard, a keypad, a touch-sensitive screen, a mouse, a microphone, and/or one or more cameras. The output devices 810 can include, for example, a display—such as a liquid crystal display (LCD)—and/or one or more loudspeakers. The network access circuitry 812 sends and receives data through computer networks such as the network 106 (FIG. 1).

A number of components of the skeleton key server 102 are stored in the memory 804. In particular, a computing device registration logic 814 is part of one or more computer processes executed within the CPU 802 after retrieval from the memory 804 in this illustrative embodiment, but can also be implemented using digital logic circuitry.

In an embodiment, the computing device registration logic 814 is executable software stored within the memory 804. For example, when the computing device registration logic 814 is executed, the computing device registration logic 814 can register the computing device 104 according to a process 900 shown in FIG. 9.

In step 902, the computing device registration logic 814 transmits a registration information request to the computing device 104. The registration information request can specify a number of user-selected fingerprintable devices accessible by the computing device 104 to be fingerprinted. Furthermore, the registration information request can also request the primary identification data 220 of the computing device 104. In an embodiment, the registration information request can also request the user account information.

In addition, the registration information request can also include the user prompt disclosed above. As previously noted, the user prompt prompts the user to make accessible to the computing device 104 the user-selected fingerprintable devices 108.

In step 904, the computing device registration logic 814 receives a device fingerprint of at least one user-selected fingerprintable device accessible by the computing device 104, and the primary identification data 220 of the computing device 104. For example, the computing device registration logic 814 can receive from the computing device 104 at least one device fingerprint 222 from at least one user-selected fingerprintable device 108. In an embodiment, the computing device registration logic 814 can also receive the user account information from the computing device 104.

Figure 10:
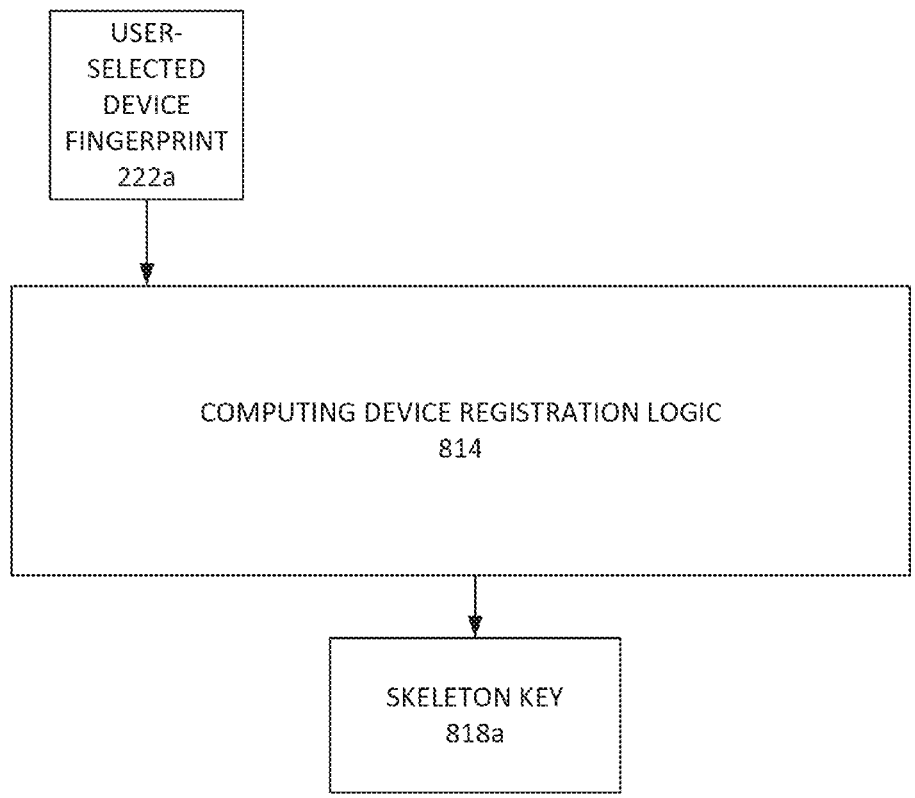
FIG. 10 is a process flow diagram depicting generation of a skeleton key by a computing device registration logic according to an embodiment of the present invention.
Figure 11:
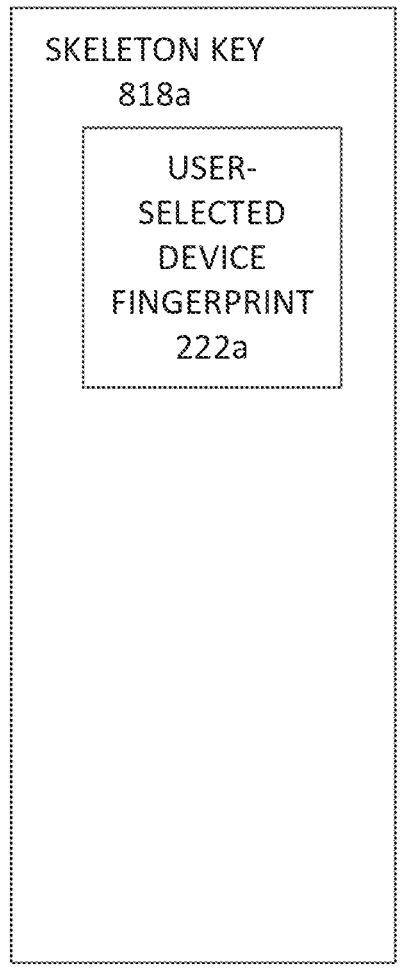
FIG. 11 is a block diagram model of a skeleton key generated by a computing device registration logic according to an embodiment of the present invention.
Figure 12:
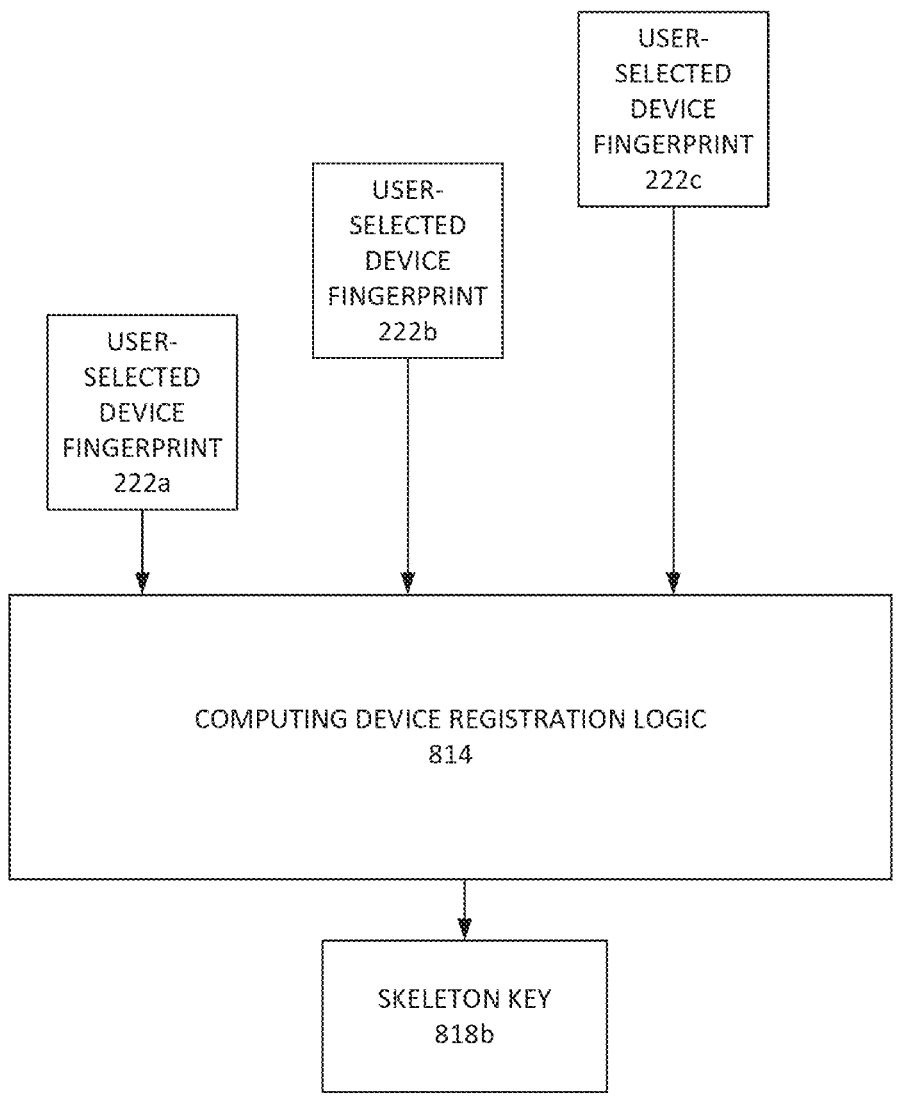
FIG. 12 is a process flow diagram depicting generation of a skeleton key by a computing device registration logic according to an embodiment of the present invention.
Figure 13:
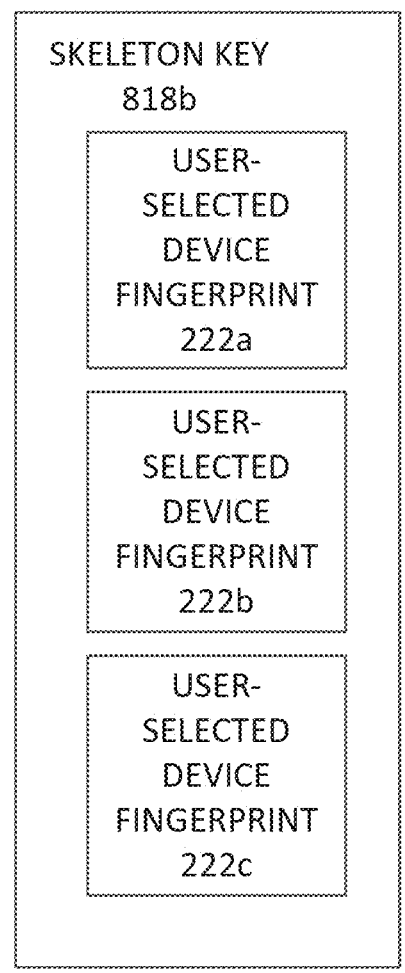
FIG. 13 is a block diagram depicting a skeleton key generated by a computing device registration logic according to an embodiment of the present invention.
Figure 14:
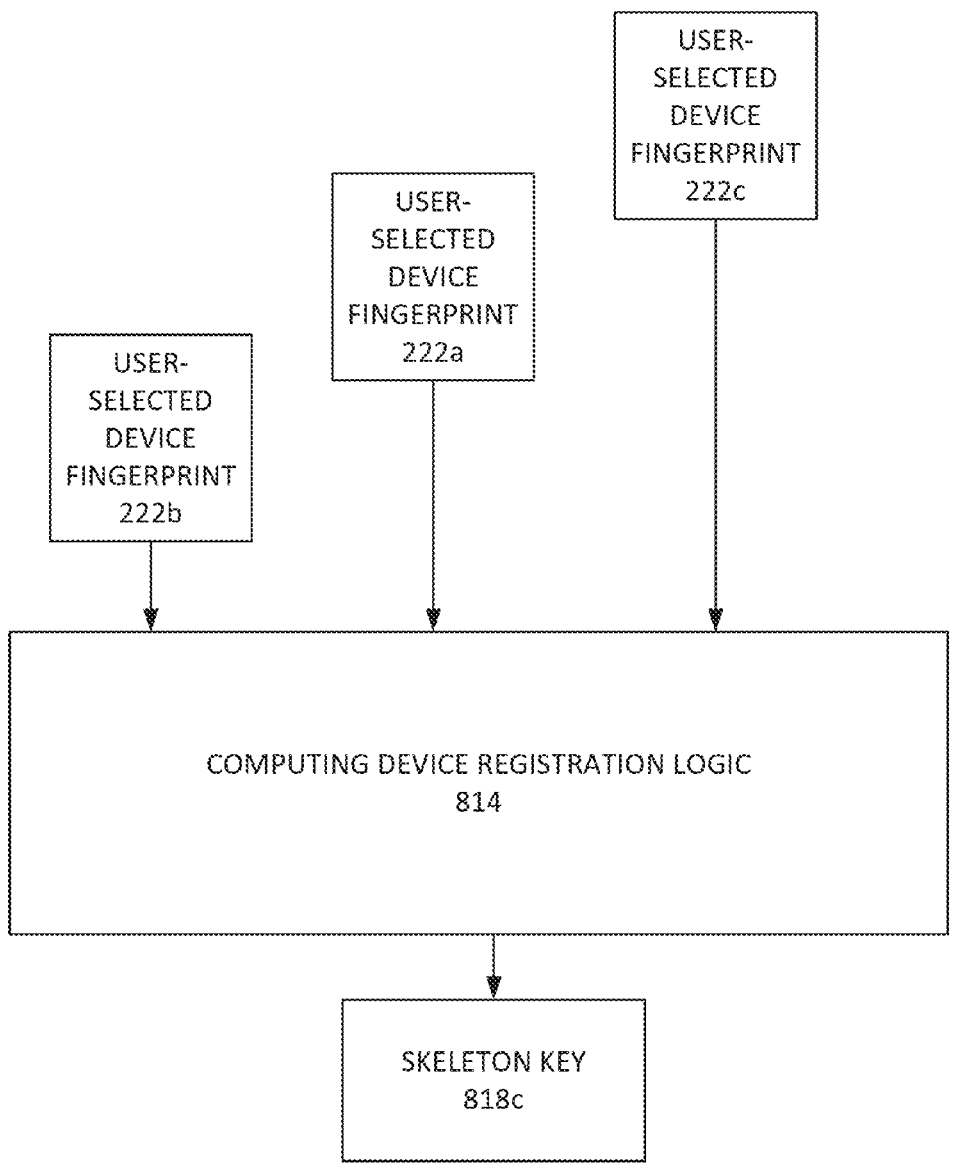
FIG. 14 is a block diagram depicting generation of a skeleton key by a computing device registration logic according to an embodiment of the present invention.
Figure 15:
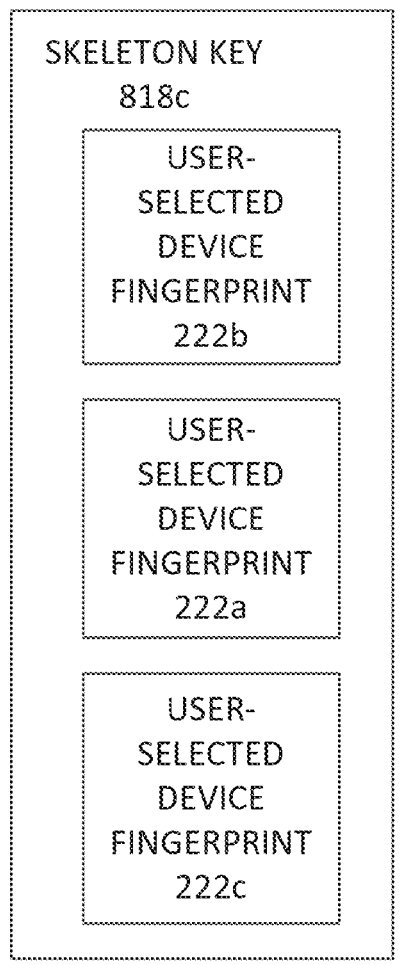
FIG. 15 is a block diagram depicting a skeleton key generated by a computing device registration logic according to an embodiment of the present invention.

In step 906, the computing device registration logic 814 generates a skeleton key 818 using the device fingerprint of the at least one user-selected fingerprintable device. For example, the computing device registration logic 814 can generate the skeleton key 818 using the device fingerprints 222 received from the computing device 104. For example, in FIGS. 10 and 11, the computing device registration logic 814 generates a skeleton key 818a from the device fingerprint 222a. In FIGS. 12 and 13, the computing device registration logic 814 generates a skeleton key 818b from the device fingerprints 222a, 222b, and 222c. As can be seen, the use of two additional device fingerprints 222b and 222c in addition to the device fingerprint 222a generates the skeleton key 818b, which is different than the skeleton key 818a.

Optionally, the computing device registration logic 814 can generate the skeleton key 818 based on an order that the device fingerprints 222 are received by the skeleton key server 102. For example, in FIGS. 12 and 13, the reception of the device fingerprint 222a, then the device fingerprint 222b, and finally the device fingerprint 222c generates the skeleton key 818b. However, the reception of the device fingerprint 222b, then the device fingerprint 222a, and finally the device fingerprint 222c generates the skeleton key 818c, which is different than the skeleton key 818b. In an embodiment, the skeleton key 818 comprises an encryption or decryption scheme using the device fingerprints 222.

In step 908, the computing device registration logic 814 records the primary identification data 220. For example, the computing device registration logic 814 can record the primary identification data 220 in the memory 804 or other storage devices which are accessible by the skeleton key server 102. In step 910, the computing device registration logic 814 associates the skeleton key 818 and the primary identification data 220 with the user account indicated by the user account information.

In an embodiment, the use of the device fingerprints 222 of the user-selected fingerprintable devices 108 and the skeleton key 818 can, for example, allow the user to securely register and authenticate the computing device 104 without having to remember complex passwords. Instead, the user can remember which user-selected fingerprintable devices 108 to use to register and authenticate the computing device 104.

Thus, from a user's perspective, he only needs to remember which user-selected fingerprintable devices 108 to use for subsequent authentication. From a hacker's perspective, however, he will have to contend with data encrypted by device fingerprints, which can be much more complex than a user-selected password. From a co-worker's perspective, even if he gains access to the user's computing device 104, he will be unable to authenticate the computing device 104 because he does not know which user-selected fingerprintable devices 108 are used for the skeleton key 818. Therefore, the use of the user-selected fingerprintable devices 108 and the skeleton key 818 can facilitate a more secure communications process through a more secretive registration and authentication process.

Furthermore, since the user-selected fingerprintable devices 108 are not essential for operation of the computing device 104, a wide variety of user-selected fingerprintable devices 108 can be used. For example, electronic devices which are normally outdated or have limited use can be used as the user-selected fingerprintable devices 108. This can provide, for example, further security during the registration process because obscure and outdated electronic devices which are not immediately obvious as electronic devices which the computing device 104 should have access to can be used to form the skeleton key 818. This can potentially increase the strength of the skeleton key 818. In addition, this can provide a use for the obscure and outdated electronic devices which otherwise may end up as trash. Moreover, there is no limit to the number of such peripheral devices that may provide device fingerprints for generating constituent keys for the skeleton key, therefore a user may exploit the invention to increase the complexity of the skeleton key by selecting more and more fingerprintable devices for creation of the skeleton key.

In an embodiment, the computing device authentication logic 816 is executable software stored within the memory 804. For example, when the computing device authentication logic 816 is executed, the computing device authentication logic 816 can authenticate the computing device 104 according to a process 1600 shown in FIG. 16.

In step 1602, the computing device authentication logic 816 transmits an authentication information request to the computing device 104. The authentication information request can specify a number of device fingerprints 222 requested. Furthermore, the authentication information request can also request an encrypted identification data 224, which includes an encrypted primary identification data 220 of the computing device 104. In an embodiment, the authentication information request can also request the user account information.

In step 1604, the computing device authentication logic 816 receives the encrypted identification data 224 from the computing device 104 which has been encrypted by at least one device fingerprint 222 of at least one user-selected fingerprintable device 108. As discussed above, the computing device 104 may have encrypted the identification data using any one of the constituent keys of the skeleton key, and the encrypting key or key sequence may have been chosen randomly by the identification data encryption logic 218.

Figure 17:
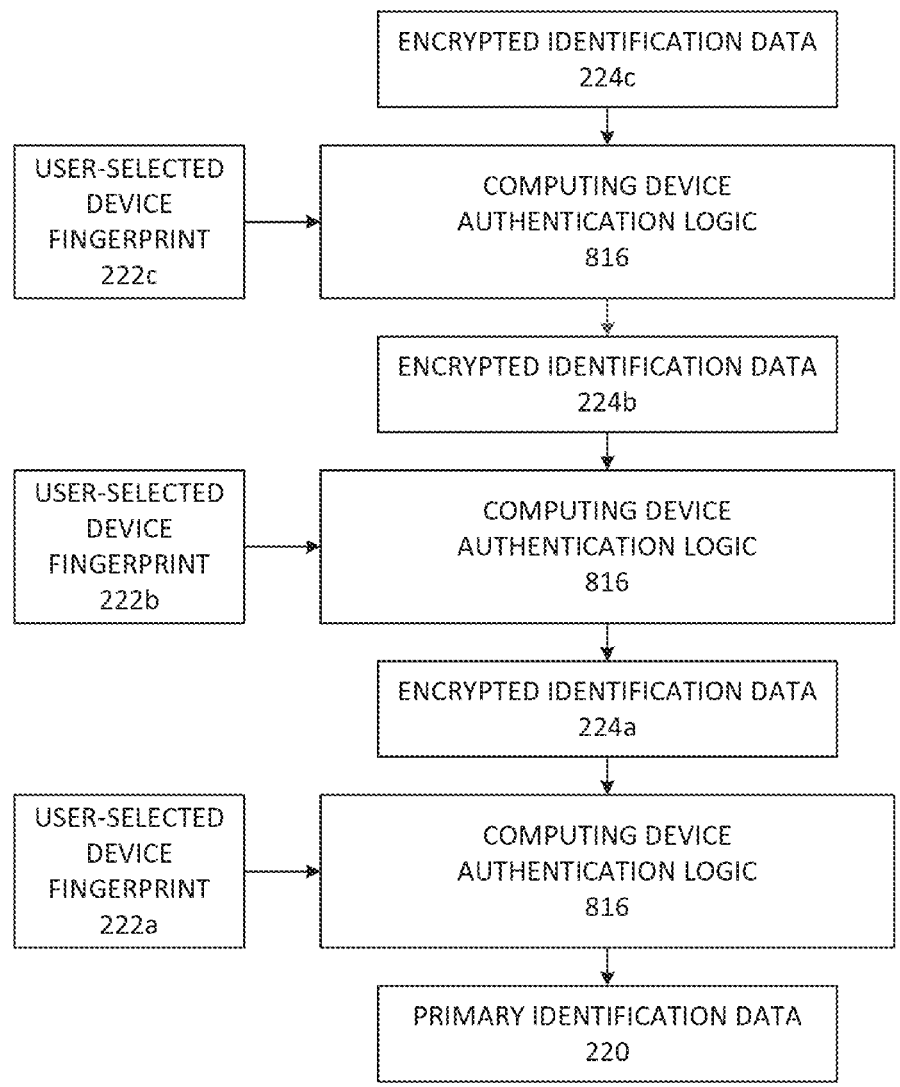
FIG. 17 is a process flow diagram illustrating decryption of encrypted identification data by a computing device authentication logic according to an embodiment of the present invention.

In step 1606, the computing device authentication logic 816 retrieves the skeleton key 818 that is associated with the user account and decrypts the encrypted identification data using the collection of possible decryption keys that constitute skeleton key 818. For example, as shown in FIG. 17, the computing device authentication logic 816 may receive, as the encrypted identification data 224, the particular encrypted identification data 224c, which has encrypted the primary identification data 220 using the sequence of device fingerprint keys 222a, 222b, and 222c (FIG. 3). The logic 816 may then decrypt the encrypted identification data 224c using a skeleton key according to the invention by attempting decryption using each of the constituent keys in trial-and-error fashion until the primary identification data 220 is successfully decrypted. Eventually, the right decryption key is utilized. At that point, the logic 816 decrypts the encrypted identification data 224c using the device fingerprint 222c to generate the encrypted identification data 224b. The logic 816 then decrypts an encrypted identification data 224b using the device fingerprint 222b to generate the encrypted identification data 224a. The logic 816 then decrypts the encrypted identification data 224a using the device fingerprint 222a to generate the primary identification data 220.

In FIG. 3, the primary identification data 220 was encrypted by the device fingerprints 222a, 222b, and 222c in that order to generate the encrypted identification data 224c. Thus, using the skeleton key 818b, the encrypted identification data 224c was correctly decrypted by the computing device authentication logic 816. That is, the computing device authentication logic 816 used the device fingerprints 222a, 222b, and 222c in reverse order of encryption to decrypt the encrypted identification data 224c to generate the primary identification data 220.

Figure 18:
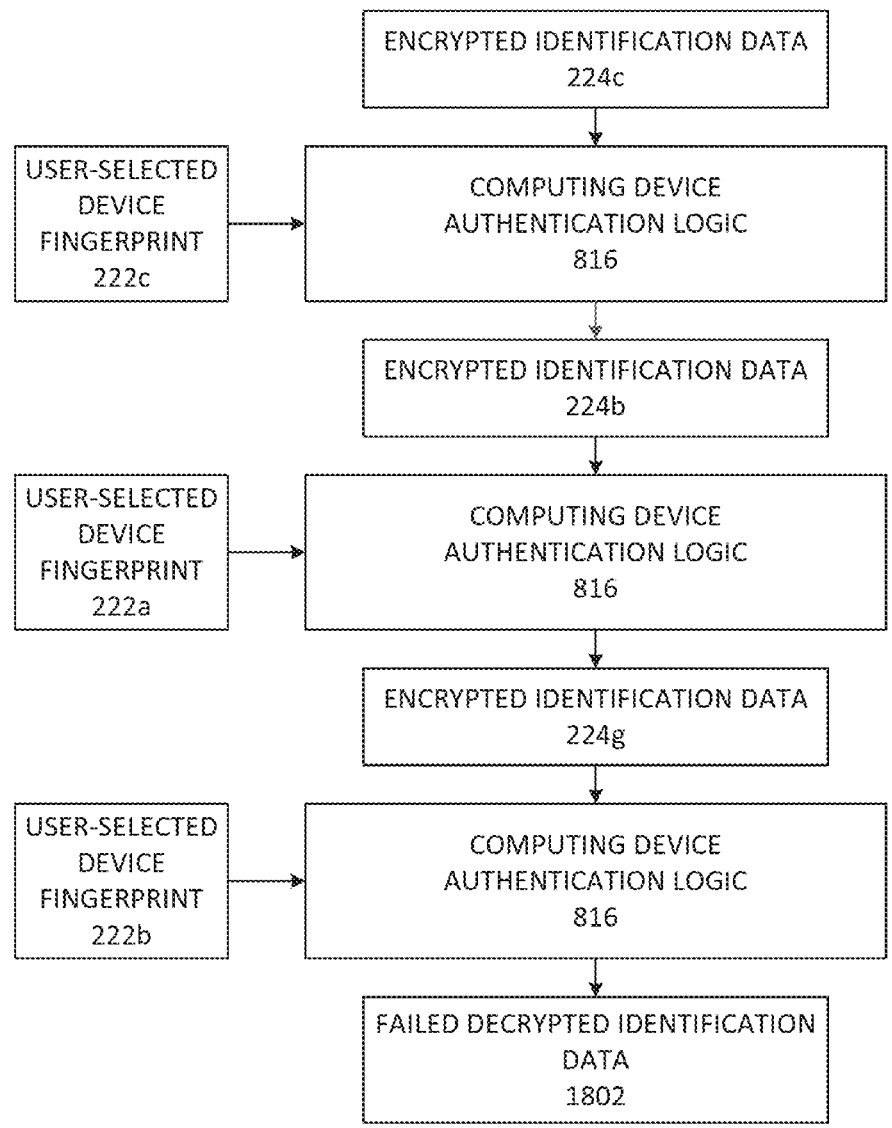
FIG. 18 is a process flow diagram depicting decryption of an encrypted identification data by a computing device authentication logic according to an embodiment of the present invention.

However, if the wrong skeleton key, such as the skeleton key 818c, was used to decrypt the encrypted identification data 224c, the wrong primary identification data would be generated as seen in FIG. 18. In FIG. 18, the computing device authentication logic 816 decrypts the encrypted identification data 224c using the device fingerprint 222c to generate the encrypted identification data 224b. The computing device authentication logic 816 decrypts the encrypted identification data 224b using the device fingerprint 222a to generate the encrypted identification data 224g. The computing device logic 816 decrypts the encrypted identification data 224g using the device fingerprint 222b to generate a failed decrypted identification data 1802. As can be seen, the failed decrypted identification data 1802 does not match the primary identification data 220 because the order in which device fingerprints 222a, 222b, and 222c were applied to decrypt the encrypted identification data 224c was wrong.

In an embodiment, the skeleton key 818 comprises all possible combinations of one or more of the device fingerprints 222a, 222b, and 222c as a series of decryption keys arranged in any order of decryption, as shown in FIGS. 5-7. The computing device authentication logic 816 can thus utilize brute force to decrypt the encrypted identification data 224c through trial and error. That is, the computing device authentication logic 816 can utilize some or all possible combinations of the device fingerprints 222a, 222b, or 222c to decrypt the encrypted identification data 224c and generate multiple identification data. In such a case, the order of the device fingerprints 222a, 222b, and 222c stored in the skeleton key 818 will not matter since the computing device authentication logic 816 will utilize some or all possible combinations of the device fingerprints 222a, 222b, or 222c to decrypt the encrypted identification data 224c.

In step 1608 the computing device authentication logic 816 compares the decrypted identification data with a primary identification data 220 associated with the user account. For example, in FIG. 17, the computing device authentication logic 816 can compare the primary identification data 220 generated with the primary identification data 220. In FIG. 18, the computing device authentication logic 816 can compare the failed decrypted identification data 1802 with the primary identification data 220. In the case where the skeleton key 818 comprises the device fingerprints 222 in any order and a brute force is utilized by the computing device authentication logic 816, the computing device authentication logic 816 can compare some or all resulting primary identification data with the primary identification data 220.

In step 1610, the computing device authentication logic 816 authenticates the computing device 104 when the decrypted identification data matches the primary identification data 220. For example, in FIG. 17, the computing device authentication logic 816 will authenticate the computing device 104 because the primary identification data 220 generated will match the primary identification data 220 recorded in the memory 804. However, in FIG. 18, the computing device authentication logic 816 will not authenticate the computing device 104 because the failed decrypted identification data 1802 will not match the primary identification data 220. In the case where brute force is utilized by the computing device authentication logic 816, if one of the resulting identification data matches the primary identification data 220, the computing device authentication logic 816 will authenticate the computing device 104. Otherwise, the computing device authentication logic 816 will not authenticate the computing device 104.

Figure 16:
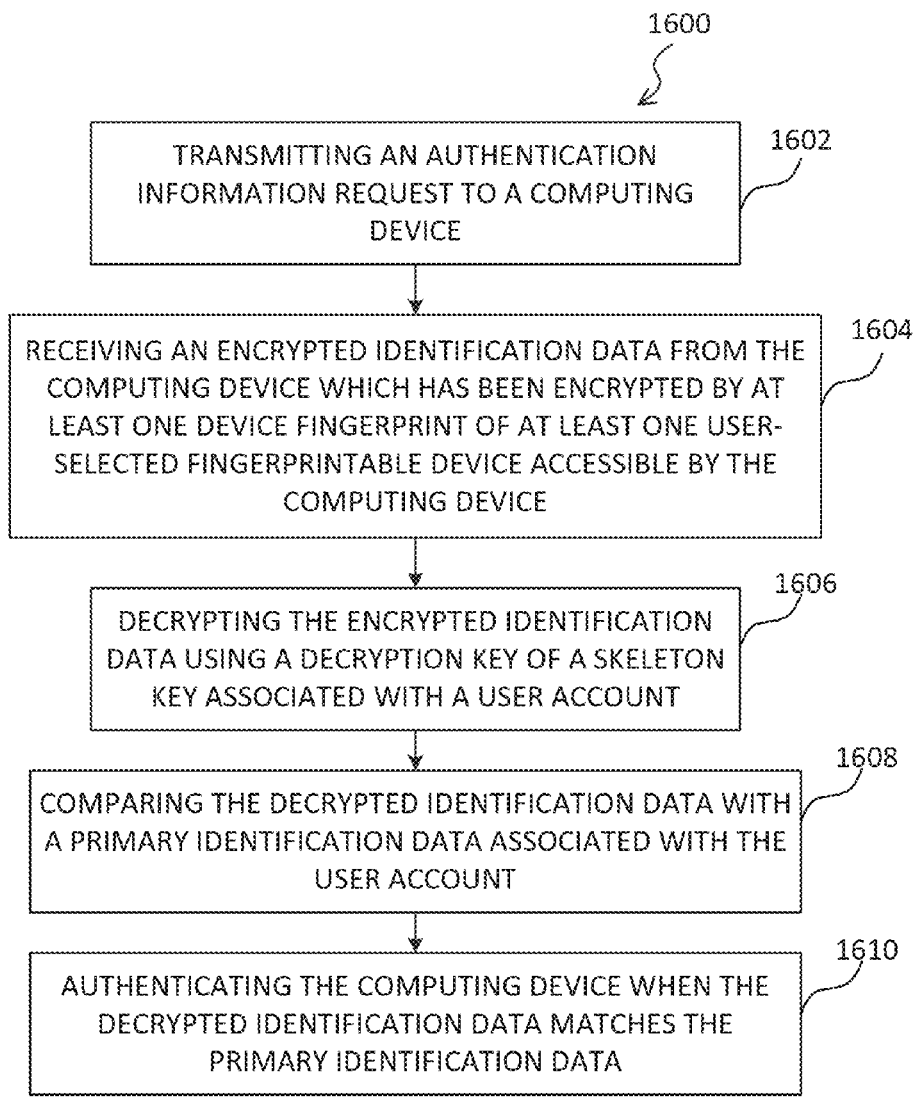
FIG. 16 is a process flow diagram showing steps for a skeleton key server to authenticate a computing device according to an embodiment of the present invention.
Figure 19:
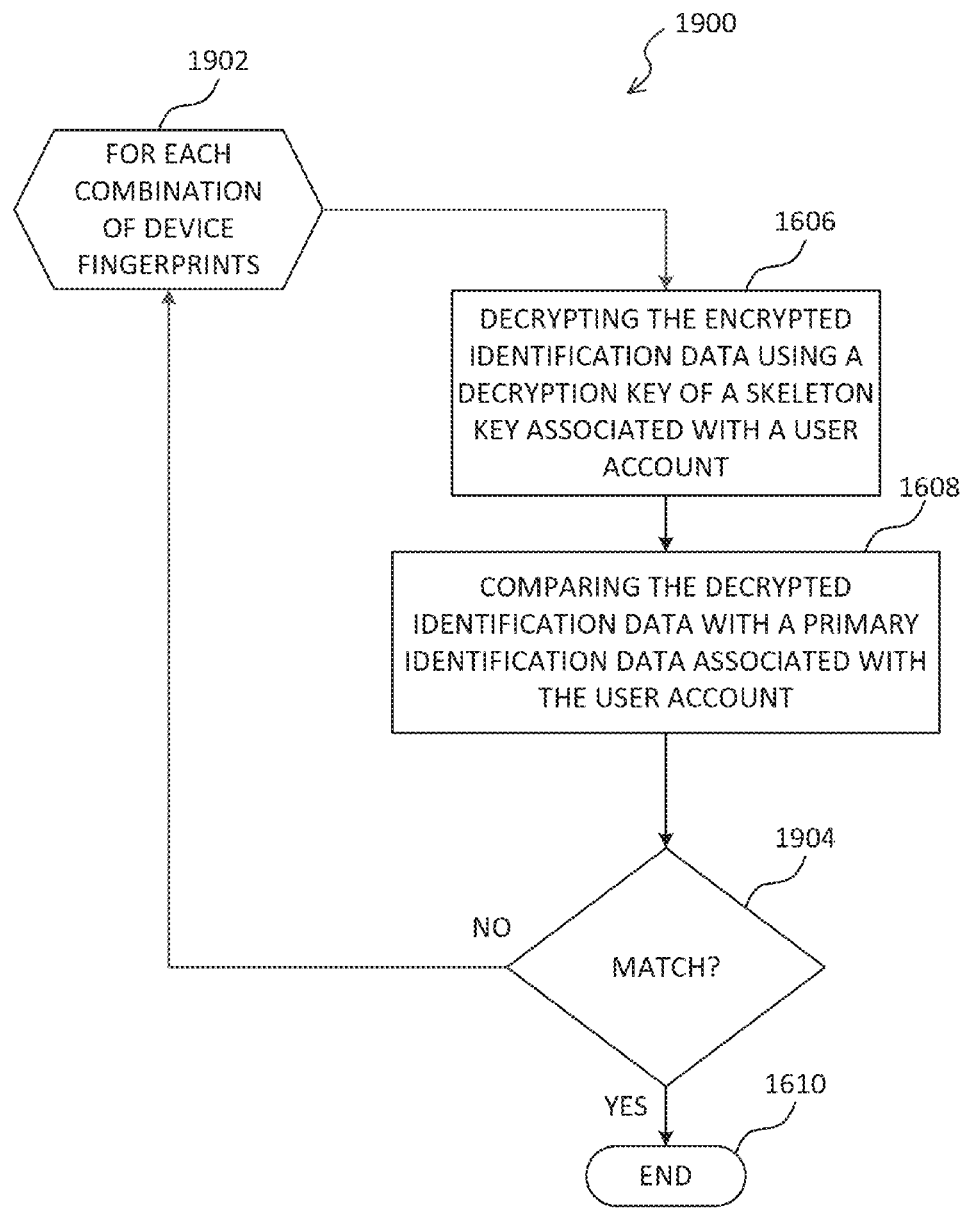
FIG. 19 is a process flow diagram showing alternative steps for a skeleton key server to authenticate a computing device using a brute force method according to an embodiment of the present invention.

The brute force method is depicted in a process 1900 shown in FIG. 19, which modifies steps 1606 and 1608 in FIG. 16. Loop step 1902 and decision block 1904 define a loop in which the computing device authentication logic 816 processes each combination of the device fingerprints 222 in the skeleton key 818 in accordance with the process 1900. For example, the computing device authentication logic 816 can process some or all of the combinations of device fingerprints 222 disclosed in FIG. 5, 6, or 7.

Thus, for each combination of the device fingerprints 222, the computing device authentication logic 816 will perform the steps 1606, 1608, and 1904 described above. In step 1904, the computing device authentication logic 816 determines whether the computing device 104 is authenticated. If so, then the process is completed at step 1610. If, however, the computing device 104 was not authenticated, then the process loops back to step 1902 and repeats, by attempting another authentication using a decryption key of the skeleton key 818.

Although the brute force method is disclosed above, other methods may also be used which can traverse through the various combinations of the device fingerprints 222 in the skeleton key 818 to accurately determine whether the computing device 104 should be authenticated or not.

Once the computing device 104 is authenticated, the computing device 104 can, for example, be granted access to secure documents. In addition or alternatively, the computing device 104 may be allowed secure communication with the skeleton key server 102. Furthermore, in an embodiment, the computing device 104 and the skeleton key server 102 can perform a secure transaction, such as a financial transaction once the computing device 104 is authenticated.

Although the above examples disclose the skeleton key 818 comprising one or more device fingerprints 222, the skeleton key 818 can also comprise one or more device fingerprints 222 which have been modified or altered. For example, one or more device fingerprints 222 can be joined together to form a modified device fingerprint. The skeleton key 818 can then comprise the modified device fingerprint. Of course other alterations and modifications are also possible and are included in the scope of the invention. In an embodiment, the skeleton key 818 can also comprise device fingerprints 222 which have been used as, or are part of, a salt, a hash, or any combination thereof.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-transitory computer readable medium useful in association with a skeleton key server which includes one or more processors, and a memory, the computer readable medium including computer instructions which are configured to cause the skeleton key server, by execution of the computer instructions in the one or more processors from the memory, to implement authentication of a first device associated with a user account using at least one second device accessible by the first device, wherein the second device is user-selected and fingerprintable, by:
- transmitting an authentication information request to the first device;
- receiving an encrypted identification data from the first device which has been encrypted by at least one device fingerprint of at least one second device accessible by the first device, wherein the second device is user-selected and fingerprintable;
- decrypting the encrypted identification data using a skeleton key associated with the user account;
- wherein the skeleton key includes at least one stored device fingerprint, and the decrypting step further comprises using the at least one stored device fingerprint to decrypt the encrypted identification data;
- comparing the decrypted identification data with a primary identification data associated with the user account; and
- authenticating the computing device when the decrypted identification data matches the primary identification data.

2. The computer readable medium of claim 1 wherein the encrypted identification data has been encrypted by device fingerprints of a plurality of second devices accessible by the first device, wherein the second devices are user selected and fingerprintable.

3. The computer readable medium of claim 2 wherein the skeleton key includes a plurality of stored device fingerprints, and the decrypting step further comprises using the plurality of stored device fingerprints to decrypt the encrypted identification data.

4. The computer readable medium of claim 3 wherein the transmitting step includes transmitting a user prompt to be displayed on the first device that prompts the user to make accessible the second devices accessible by the first device.

5. The computer readable medium of claim 1 wherein the encrypted identification data has been encrypted by device fingerprints of the second device accessible by the computing device, wherein the second device is user-selected and fingerprintable.

6. The computer readable medium of claim 5 wherein the skeleton key includes a plurality of stored device fingerprints, and the decrypting step further comprises using the plurality of stored device fingerprints to decrypt the encrypted identification data.

7. The computer readable medium of claim 6 wherein the transmitting step includes transmitting a user prompt to be displayed on the first device that prompts the user to make accessible the second device accessible by the first device.

* * * * *